United States Patent [19]

Heidjann

[11] Patent Number: 4,528,992

[45] Date of Patent: Jul. 16, 1985

[54] SELF-PROPELLED HARVESTER THRESHER

[75] Inventor: Franz Heidjann, Harsewinkel, Fed. Rep. of Germany

[73] Assignee: Claas OHG, Harsewinkel, Fed. Rep. of Germany

[21] Appl. No.: 541,740

[22] Filed: Oct. 12, 1983

[30] Foreign Application Priority Data

Oct. 12, 1982 [DE] Fed. Rep. of Germany ....... 3237677

[51] Int. Cl.³ .......................... A01F 7/04; A01F 12/00
[52] U.S. Cl. .................................. 130/27 R; 56/14.6; 130/27 T; 130/27 Z
[58] Field of Search .............................. 56/14.6, 14.5; 130/27 R, 27 T, 27 S, 27 Q, 27 Z

[56] References Cited

U.S. PATENT DOCUMENTS

| | | | |
|---|---|---|---|
| 1,859,759 | 5/1932 | Walters | 56/14.6 |
| 1,879,960 | 9/1932 | Thoen | 56/14.6 |
| 1,932,714 | 10/1933 | Thoen | 56/14.6 |
| 2,236,002 | 3/1941 | Lederer | 130/27 R |
| 2,266,805 | 12/1941 | Ronning | 130/27 R |
| 2,349,262 | 5/1944 | Good | 130/30 C |
| 2,507,669 | 5/1950 | Heth | 56/13.3 |
| 2,705,961 | 4/1955 | Worrell et al. | 130/27 R |
| 3,296,782 | 1/1967 | Mark et al. | 130/27 R |
| 3,703,802 | 11/1972 | Wrestler et al. | 130/27 R |
| 4,273,138 | 6/1981 | Pauli | 130/27 T |
| 4,303,078 | 12/1981 | Stokland | 56/14.6 |
| 4,317,326 | 3/1982 | Riedinger et al. | 56/14.6 |
| 4,338,955 | 7/1982 | Raineri | 130/27 R |
| 4,375,221 | 3/1983 | Bernhardt et al. | 130/27 T |
| 4,422,462 | 12/1983 | Decoene | 130/27 T |

*Primary Examiner*—Paul J. Hirsch
*Attorney, Agent, or Firm*—Michael J. Striker

[57] ABSTRACT

A self-propelled harvester thresher with a cleaning device has a carrier vehicle with a grain tank, an axial threshing mechanism releasably connected with the carrier vehicle, a cutting mechanism releasably connected with the carrier vehicle and being wider than the axial thresher mechanism, wherein the cleaning device is connected with the axial threshing mechanism and extends normally to its transporting direction.

4 Claims, 3 Drawing Figures

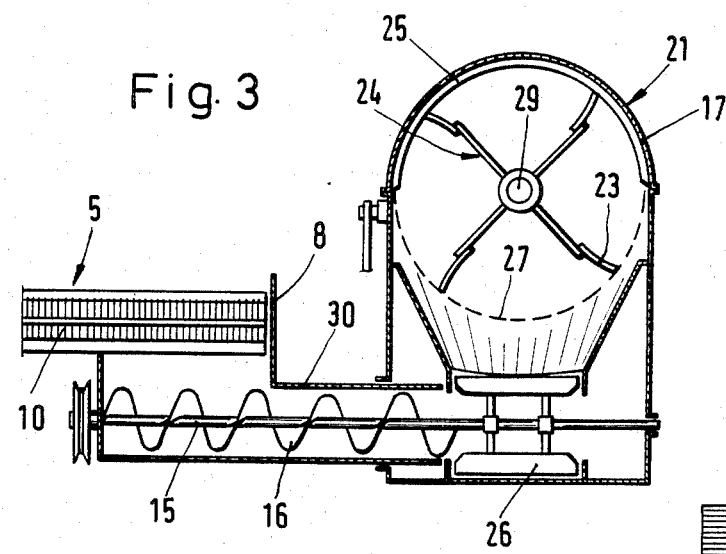
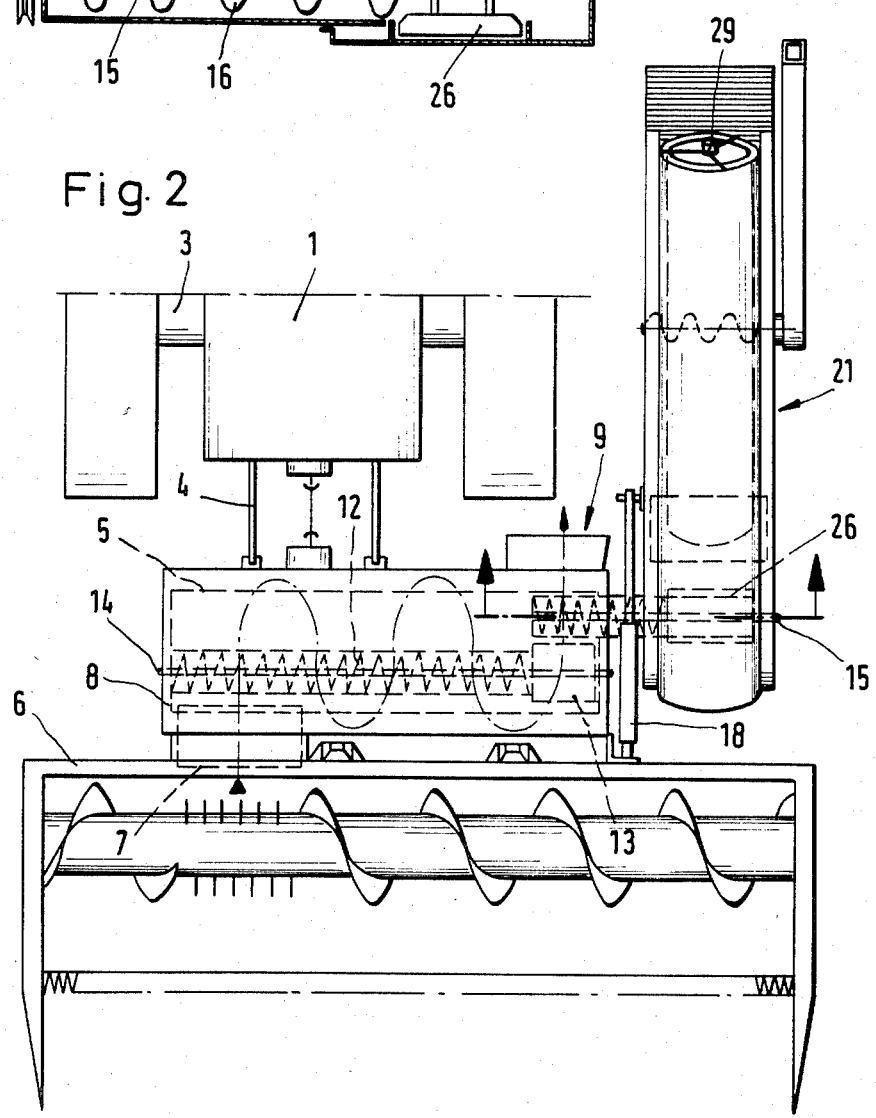

SELF-PROPELLED HARVESTER THRESHER

BACKGROUND OF THE INVENTION

The present invention relates to a self-propelled harvester thresher.

More particularly it relates to a self-propelled harvester thresher with a cleaning device, wherein the harvester thresher includes a carrier vehicle with a grain tank, as well as an axial threshing mechanism with a wider cutting mechanism releasably connected with the carrier vehicle.

Self-propelled harvester threshers of the above-mentioned type are known in the art. Because of the so-called street and railroad profile the outer dimensions of the harvester thresher must be within certain narrow limits. On the other hand, the agriculture requires to have harvester threshers with high outputs. On this ground, new harvester threshers were developed in which the cutting mechanism is wider than allowed by the street and railroad transportation. In this case the cutting mechanism must be disassembled during the street and road transportation and transported separately. Even in this approach the cutting mechanism can be made wider in certain limits, since the harvester product cut by the cutting mechanism must also be processed. In other words, the threshing elements proper limit finally the throughput because they in their dimensions inside the harvester thresher depend upon the street and railroad profile. For eliminating this disadvantage a harvester thresher is known in which on the other hand, a transportation on the streets and by railroad is possible without great difficulties, and, on the other hand, the dimension of the threshing unit and therefore the dimension of the cutting mechanism trough are determined freely, wherefore the requirement of a maximum throughput can be taken into consideration. In this harvester thresher the axial threshing and separating mechanism is formed as a separate structural unit which is arranged between the inclined conveyor and the cutting mechanism also formed as separate structural units, and releasable connected with the latter. The carrier vehicle is provided with the wind sieve device and the grain tank. After mounting of other aggregates, it can be used for other purposes only with difficulties. A further disadvantage is that the dimensions of the grain tank are limited because of mounting of the wind sieve device.

SUMMARY OF THE INVENTION

Accordingly, it is an object of the present invention to provide a self-propelled harvester thresher which avoids the disadvantages of the prior art.

It is another object of the present invention to provide a self-propelled harvester thresher of the above-described type, which in a satisfactory manner satisfies the requirements of a universal utilization of its carrier vehicle and of a great capacity of its grain tank.

In keeping with these objects and with others which will become apparent hereinafter, one feature of the present invention resides, briefly stated, in a self-propelled harvester thresher which has a carrier vehicle, an axial threshing mechanism and a wider cutting mechanism releasably connected with the carrier vehicle, and wherein a cleaning device is connected with the axial threshing mechanism and extends normal to the product transporting direction of the latter.

When the harvester thresher is designed in accordance with these features, it attains the above mentioned objects.

The cleaning device is turnable about an axle supported in its receiving region in the axial threshing mechanism and extending transverse to the transportation direction of the cleaning device. This has the advantage that a substantially greater grain tank can be used on the carrier vehicle, since the cleaning device is arranged outside of the carrier vehicle.

A further advantage of the inventive harvester thresher is that the carrier vehicle after disassembling of the axial threshing mechanism or in some cases after removal of the grain tank therefrom, can also be used for other purposes, for example as a carrier vehicle for a plow.

In accordance with a further feature of the present invention, the pivot axle of the cleaning device is provided with a screw sheet and a throw conveyor connected therewith. In such construction it is possible to transfer the harvested product transported from the axial threshing device in a simple manner to the cleaning device.

It is also advantageous when the cleaning device is formed so that it is composed of a rotatable cylindrical cleaner and a plan sieve-pressure wind cleaner located underneath the rotatable cleaner.

In accordance with another feature of the present invention, the rotatable cleaner is subdivided into a grain region and a transfer region.

For providing a uniform loading of the plan sieve-pressure wind cleaner during threshing at the side, the plan sieve-pressure wind cleaner is arranged turnable about an axis extending parallel to the travelling direction.

Still another feature of the present invention is that the entire cleaning device during the operation with ascending or descending is formed adjustable in its inclination by a known means.

Still a further feature of the present invention which provides a simple construction is that the rotatable cleaner includes a rotor with a transporting screw in its receiving region and a housing which surrounds the rotor and has an upper part with the guide strips raising in the transporting direction and a lower half formed sieve-shaped.

It has been recognized that for the street transportation of the axial threshing mechanism is advantageous when the housing of the axial threshing mechanism has a width corresponding to the entire depth of the cleaner, in accordance with a further feature of the present invention. When the axial threshing mechanism for the street transportation is placed on a separate carriage, the cleaner connected with the axial threshing mechanism and lifted for the street transportation does not occupy in the width more place than the axial threshing mechanism.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 2 is a view showing the part of FIG. 1 on a plan view; and

FIG. 3 is a view showing a section taken along the line 3—3 in FIG. 2.

DESCRIPTION OF A PREFERRED EMBODIMENT

Figure 1:
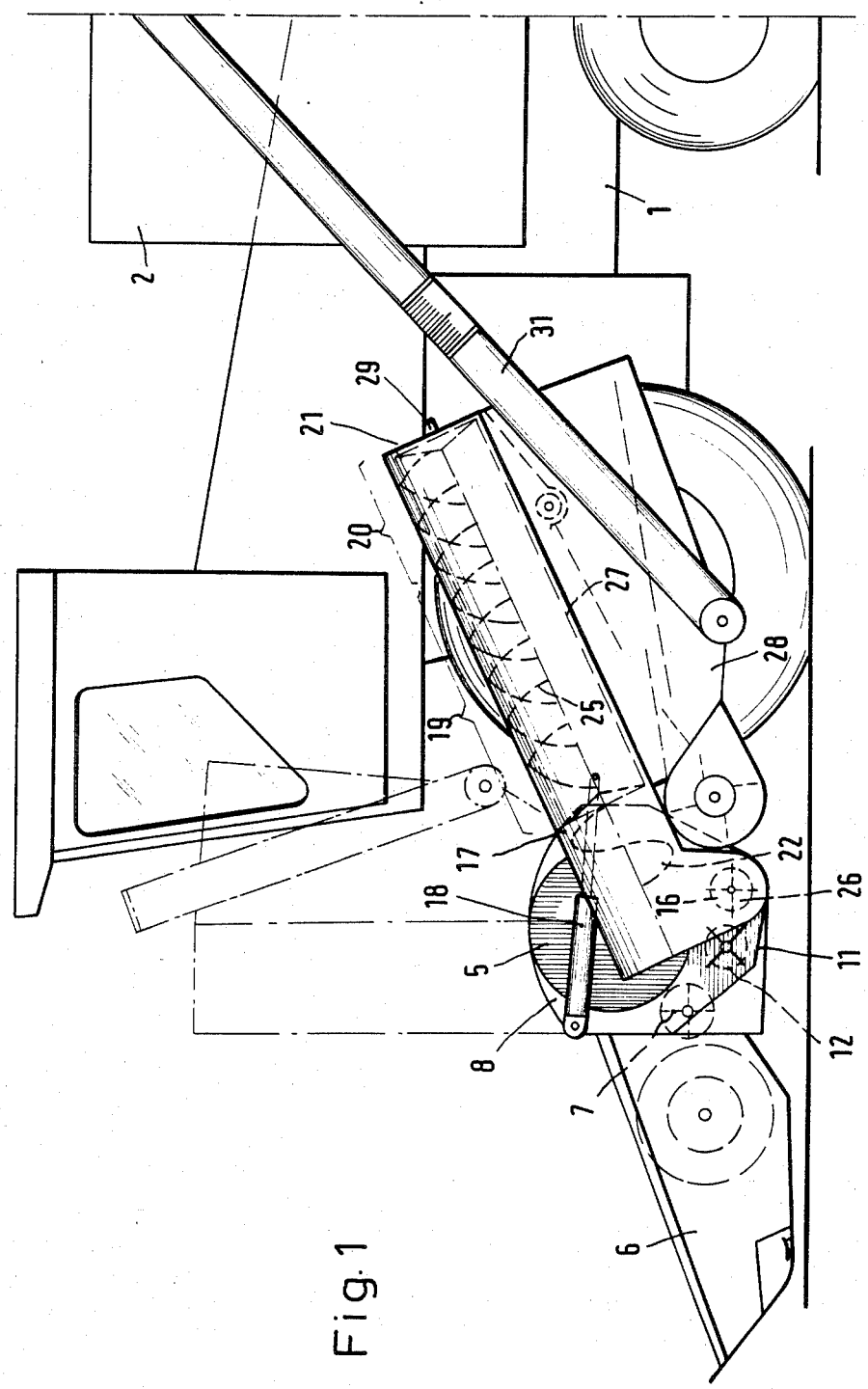
FIG. 1 is a view showing a front part of a harvester thresher in accordance with the present invention, in side view.

Reference numeral 1 identifies a carrier vehicle of a self-propelled harvester thresher, and reference numeral 2 identifies a grain tank arranged on the same. The vehicle 1 has a three-point suspension 4 located forwardly of a driving axle 3 and releasably connecting an axial threshing mechanism 5 with the vehicle 1. The axial threshing mechanism 5 in turn carries a cutting mechanism 6.

The harvested product transported from the cutting mechanism 6 moves via an intermediate conveyor 7 into a housing 8 which accommodates the axial threshing mechanism 5. During the rotation of a rotor of the axial threshing mechanism 5 the harvested product displaces by built-in guide strips helically around the same to the right (as shown in FIG. 2) and is threshed in cooperation with a threshing basket 10 provided underneath the rotor. The threshed product discharges through a housing opening 9 as a windrow onto a field, whereas the uncleaned grain falls through the threshing basket (FIG. 3) downwardly into a trough 11 of the housing 8. A collecting screw 12 is located in the trough 11 and conveys the grain product to the right (FIG. 2) to a throw conveyor 13. The collecting screw 12 and the throw conveyor 13 have a common axle 14. A further axle 15 is supported in the housing 8 and extends parallel to the axle 14 at a lateral distance therefrom. The axle 15 extends substantially with its half laterally outwardly of the housing 8. The axle 15 is provided with screw sheets 16 at least on its part located in the housing 8. The screw sheets 16 transport the grain product which is thrown from the throw conveyor 13 from the trough 11 to the right out of the housing 8.

As can be seen from FIG. 2, the axle 15 and more particularly its part extending beyond the housing 8 supports a substantially cylindrical housing 17 which is turnable about the axle 15. The turning of the housing 17 is performed by a cylindrical-piston unit 18, with a piston connected with the housing 17 and a cylinder connected with the housing 8.

A rotatable precleaner 21 subdivided into a grain region 19 and a transfer region 20 is provided in the cylindrical housing 17. The precleaner is formed in its drawing region as a drawing screw 22. Further the rotatable precleaner 21 includes a rotor 24 provided with blades 23, and also guide or transport strips 25 connected with the cylindrical housing 17 and associated with the rotor.

The grain product transported by the screw sheets 16 displaces to the throw conveyor 26 which is mounted on the axle 15 and particularly on its portion extending beyond the housing 8 and is surrounded by the cylindrical turnable housing 17. The throw conveyor 26 throws the grain product into the throwing screw 22, from which the product moves to the rotatable precleaner 21 and is subjected to a first cleaning. The straw transported rearwardly as considered in a transporting direction falls from the cylindrical housing 17 onto the field. The grain which falls downwardly through a sieve bottom 27 of the housing 17 falls onto a sieve bottom of a sieve wind cleaner 28 of a known construction. The sieve wind cleaner 28 is suspended underneath the rotatable cleaner 21 pivotably about a rotor axle 29 and can be horizontally adjusted during threshing at the side so as to provide optimum cleaning by uniform product distribution on the sieve bottom.

For street transportation the cutting mechanism 6 is uncoupled from the axial threshing mechanism 5 or from the housing 8 and placed on a separate cutting mechanism carriage. After this the housing 8 is released from the three-point suspension 4 and placed onto a second carriage, while then the entire cleaner is turned upwardly about the axle 15. During the street transportation it is not wider and does not occupy more space than the housing 8. On this ground, transmitting transport means 31 from the grain tank 2 are formed releasable or foldable.

It should also be mentioned that the throw openings from the housing 8 to the cylindrical housing 17 are overlapped by a tubular piece 30. The tubular piece 30 is fixedly connected with the lateral wall of the housing 8 and on the other hand, sealingly abuts against the housing wall of the cylindrical housing 17 which in this region is formed with a plan surface.

It will be understood that each of the elements described above, or two or more together, may also find a useful application in other types of constructions differing from the types described above.

While the invention has been illustrated and described as embodied in a self-propelled harvester thresher with a cleaning device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A self-propelled harvester thresher, comprising a carrier vehicle with a grain tank; an axial threshing mechanism releasably connected with said carrier vehicle and having a predetermined direction of transporting a harvested product; a cutting mechanism releasably connected with said carrier vehicle and having a width which is greater than that of said axial threshing mechanism; cleaning means connected with said axial threshing mechanism and transporting the harvested product in a direction which is normal to the direction of transportation of said axial threshing mechanism, said cleaning means having a receiving region; and an axle supported in said axial threshing mechanism and in said receiving region of said cleaning means and extending transverse to the transporting direction of said cleaning means, said cleaning means being turnable about said axle.

2. A self-propelled harvester thresher as defined in claim 1, wherein said axle is provided with a screw sheet and a throw conveyor connected therewith.

3. A self-propelled harvester thresher as defined in claim 1, wherein said cleaning means includes a rotatable cleaner and a plan sieve-pressure wind cleaner arranged underneath of said rotatable cylindrical cleaner, said plan sieve-pressure wind cleaner being turnable about an axis extending parallel to a travelling direction.

4. A self-propelled harvester thresher as defined in claim 3, wherein said entire cleaning means has a predetermined height, said axial threshing mechanism having a housing with a depth as seen in a travelling direction, which substantially corresponds to the height of the entire cleaning means including said rotatable cleaner and said plan sieve-pressure wind cleaner.

* * * * *